(12) United States Patent
Mimura

(10) Patent No.: US 6,285,887 B1
(45) Date of Patent: Sep. 4, 2001

(54) TRANSMISSION POWER CONTROL SYSTEM AND TRANSMISSION POWER CONTROL METHOD IN CODE DIVISION MULTIPLE ACCESS SYSTEM

(75) Inventor: Yukie Mimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/396,729

(22) Filed: Sep. 15, 1999

(30) Foreign Application Priority Data

Sep. 18, 1998 (JP) ................................................ 10-264670

(51) Int. Cl.[7] ...................................................... H04B 7/00
(52) U.S. Cl. ...................... 455/522; 455/226.3; 370/331; 370/333
(58) Field of Search .............................. 455/522, 69, 115, 455/132, 134, 135, 436, 437, 226.1, 226.2, 226.3; 370/331, 332, 333, 342, 318

(56) References Cited

U.S. PATENT DOCUMENTS

| | | | |
|---|---|---|---|
| 5,924,043 | * 10/2000 | Takano | 455/522 |
| 6,138,033 | * 10/2000 | Kitade et al. | 455/522 |
| 6,144,861 | * 11/2000 | Sundelin et al. | 455/522 |

FOREIGN PATENT DOCUMENTS

| | | |
|---|---|---|
| 8-125604 | 5/1996 | (JP) . |
| 9-312881 | 12/1997 | (JP) . |
| 9-327073 | 12/1997 | (JP) . |

* cited by examiner

Primary Examiner—William G. Trost
Assistant Examiner—Congvan Tran
(74) Attorney, Agent, or Firm—McGinn & Gibb, PLLC

(57) ABSTRACT

A transmission power control system in code division multiple access (CDMA) system, which makes possible to control an aimed SIR, which is compared with a measured SIR for the transmission power control, in order to maintain all channels to be an optimum communication quality even when there is a difference in communication quality in each channel in a multi-code transmission, is realized. The transmission power control system comprises at least one base station and a base station control apparatus. The base station measures the signal to interference ratio (SIR) of a received signal corresponding to each of a plurality of channels established between the base station and a mobile station, and determines a bit pattern for transmission power control for each of groups specified to the plurality of channels on the basis of the aimed SIR and the measured SIR. The base station control apparatus determines the aimed SIR on the basis of data giving groups specified to the plurality of channels and the communication quality corresponding to each of the channels, and instructs the aimed SIR to the base station.

8 Claims, 12 Drawing Sheets

Fig. 7

1 FRAME

| TPC BITS | Pilot BITS | ▨ | DATA BITS |

CHANNEL NUMBER THAT TPC BITS HAVE BEEN ADDED TO.

Fig. 8

| GROUP NUMBER | CHANNEL NUMBER | COMMUNICATION QUALITY (FER) | AIMED SIR |
|---|---|---|---|
| 1 | channel 1 | 7.0 × 10-4(-31.55dB) | 6.5dB |
| | channel 4 | 6.3 × 10-3(-22.00dB) | |
| | channel 6 | 4.5 × 10-3(-23.47dB) | |
| 2 | channel 3 | 5.0 × 10-3(-23.01dB) | 6.3dB |
| 3 | channel 2 | 8.0 × 10-3(-20.97dB) | 7.0dB |
| | channel 5 | 7.5 × 10-3(-21.25dB) | |

Fig.9
GROUP 1
- MODEM CARD mc3 OUTPUT
- MODEM CARD mc4 OUTPUT
- MODEM CARD mc6 OUTPUT
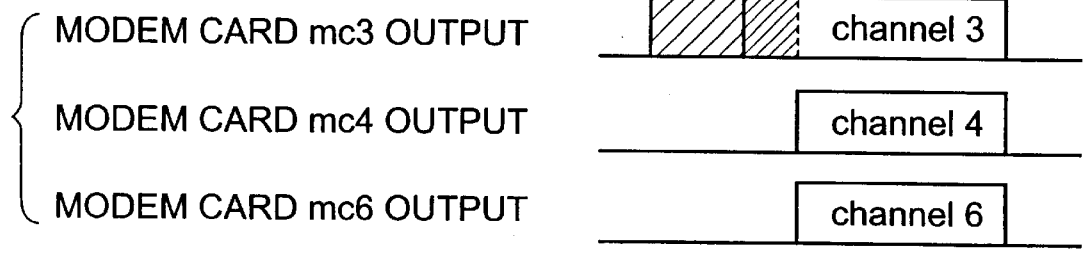
GROUP 2
- MODEM CARD mc2 OUTPUT
- MODEM CARD mc5 OUTPUT
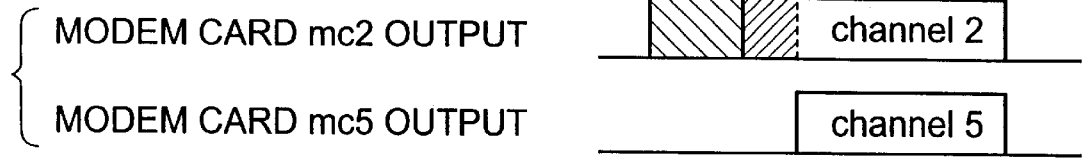
GROUP 3
- MODEM CARD mc1 OUTPUT
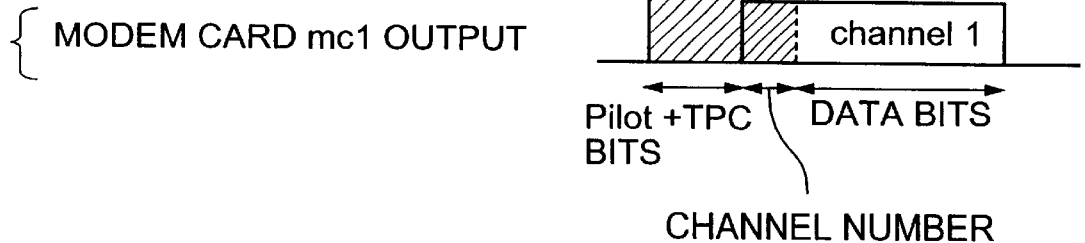
Pilot +TPC BITS | DATA BITS
CHANNEL NUMBER

TRANSMISSION POWER CONTROL SYSTEM AND TRANSMISSION POWER CONTROL METHOD IN CODE DIVISION MULTIPLE ACCESS SYSTEM

BACKGROUND OF THE INVENTION

1. Technical Field of the Invention

The present invention relates to a transmission power control system and a transmission power control method in code division multiple access system.

2. Description of the Related Art

In the technical field of mobile communication, the code division multiple access (CDMA) system attracts attention as a technique for effectively utilizing a frequency band. A base station of the CDMA system needs a very large processing gain for receiving a desired radio signal transmitted from a mobile station locating at a far from the base station, and for eliminating an undesired radio signal, which interferes with receiving the desired radio signal, transmitted from a mobile station locating at a near from the base station.

For solving this problem on distance, there is a transmission power control (TPC) method. In this method, transmission power of each mobile station is controlled so that a base station receives the same level of power from any mobile station which is locating anywhere in a service area.

As a technique in relation to this transmission power control in mobile communication, Japanese Patent Application Laid-open No. 125604/1996 discloses a transmission power control method in which it is judged whether a signal to interference ratio (SIR: the ratio of the received power of a desired signal to the received power of an interference signal) calculated in a base station is larger than a predetermined SIR or not, transmission power control bits as a result of the judgement is spread in spectrum into a signal of a transmission power control channel, and the signal of the transmission power control channel is transmitted in parallel with a signal of a communication channel. In addition, Japanese Patent Application Laid-open No. 327073/1997 discloses a method of arranging and transmitting pilot channels for effectively allocating a pilot channel to forward radio channels, which are time division multiplexed, and further for reducing the power of a pilot channel interfering to another cell.

In parallel with the above disclosed techniques, a technique of a transmission power control method is disclosed in "1997 General Meeting Convention Record of the Institute of Electronics, Information and Communication Engineers, Communication 1, B-5-81" (hereinafter called prior art).

A high-speed closed loop control system disclosed in the prior art is shown in FIG. 12. A transmission power control method according to this system concerns a forward link but a similar control method is also applied to a reverse link.

FIG. 12 shows a state that a mobile station 901 establishes communication channels by six connections (multi-connection) at the same time between the mobile station 901 and a base station 902 to perform a multi-code transmission. Such a multi-code transmission is applied in case of performing a simultaneous transmission of a voice and data, a high-speed data transmission with parallel connections, or the like. An individual spread code is assigned to each of the connections.

This system comprises the mobile station 901, base station 902 and base station control apparatus 903. Communication channels corresponding to the multi-connection between the mobile station 901 and base station 902 are established between the base station 902 and a base station control apparatus 903. The base station 902 comprises an amplification part 904 and modem cards MCs (MC1 to MC6 are shown in FIG. 12) corresponding to the respective connections (the number of connections is six in FIG. 12). The base station control apparatus 903 comprises diversity hand-over trunks (DHT1 to DHT6 are shown in FIG. 12) corresponding to the connections, a quality measurement part 907 and an aimed-SIR determination part 908.

The modem cards (MC1 to MC6) of the base station 902 have functions of performing transmission and reception of radio signals between the base station 902 and the mobile station 901 corresponding to the respective connections, and each comprises a reception part and a transmission part of the signals according to CDMA system of the prior art.

In this reception part of each modem card, the signal to interference ratio (SIR) is measured in received signals (measured SIR), and it is compared with an aimed SIR which has been predetermined separately. With the result of the comparison, a TPC (transmission power control) bit pattern for controlling the transmission power is determined which pattern is to be transmitted to the mobile station 901 in addition to a forward link signal transmitted from the corresponding transmission part. For example, when the measured SIR is smaller than the aimed SIR, a request for increasing the reverse transmission power is given to the mobile station 901 with the TPC bits. Conversely, when the measured SIR is larger than the aimed SIR, a request for decreasing the reverse transmission power is given to the mobile station 901 with the TPC bits.

The minimum value of the SIR, which is necessary to meet a predetermined communication quality, is used as the aimed SIR in the high-speed closed loop control. The communication quality is determined on the basis of the frame error rate (FER) in contents of data of received reverse signals. For some reasons such as a fluctuation of propagation characteristics of radio signals, there is a case that the predetermined communication quality is not attained even when the measured SIR obtained from a measurement level of received signals meets the aimed SIR. In contrast with this, when the measured SIR does not reach the aimed SIR, there is a case that the predetermined communication quality is obtained.

For this reason, in consideration of a situation that the mobile station 901 is also in communication with another base station (not shown) by soft hand-over or the like, the base station control apparatus 903 carries out site diversity synthesis of received signals with the other base station corresponding to respective connections by the diversity hand-over trunks (DHT1 to DHT6). Further, the base station control apparatus 903 takes in the received signals after the diversity synthesis to the quality measurement part 907, where the communication quality is measured. The aimed SIR determination part 908 controls to predetermine the aimed SIR at regular intervals on the basis of the measured communication quality. For example, the aimed SIR is increased when the communication quality deteriorates to be less than a predetermined value, and the aimed SIR is decreased when the communication quality is superior to the predetermined value, so that it is controlled to obtain the predetermined communication quality.

Besides, in the base station control apparatus 903, the control of the aimed SIR is performed in consideration of all connections corresponding to the mobile station 901 because the relation between the channels corresponding to the connections established when the respective connections of the multi-connection are established and the mobile station 901 using them is under control of a central processing unit (not shown). A common aimed SIR regulated for all of those connections is sent to the modem cards (MC1 to MC6) of the base station 902.

A conventional transmission power control in a multi-connection is based on an instruction from the base station control apparatus 903 on the assumption that the communication qualities in all connections constituting the multi-connection are the same. That is, as shown in FIG. 13, pilot bits to add to a forward transmission signal and TPC bits (pilot+TPC bits are shown in FIG. 13) are determined on the basis of a measurement result of SIR by the modem card MC1, and added to the transmission signal of the corresponding first connection. The pilot bits are used in a frame synchronism establishment process.

In this manner, by making the pilot+TPC bits common to all connections, it becomes possible to set a large transmission power of the pilot+TPC bits per connection as shown in FIG. 14. As a result, in control of each connection, accuracy in transmission power control or accuracy in channel estimation with the pilot bits can be improved. Besides, since the transmission power of the common pilot+TPC bits can be set to be smaller than the other bits of the signal in which the connections are synthesized, the interference power to other mobile station can be reduced.

In the conventional control of the aimed SIR in this multi-connection transmission, however, there are the following problems.

Because a common value as the aimed SIR set for the modem cards is used for all connections, there is a difference in the communication qualities of received signals of the connections measured in the quality measurement part 907, the aimed SIR determination part 908 becomes hard to determine an aimed SIR in order that all connections are of a predetermined communication quality. For example, when the aimed SIR is increased on the basis of the connection of the worst communication quality, the other connections have excessive reverse transmission powers so the interference power to other mobile station increases. In contrast with this, when the aimed SIR is decreased on the basis of the connection of the best communication quality, the other connections are of less than the predetermined communication quality. Further, a similar problem arises even when the aimed SIR is controlled on the basis of the mean communication quality of all connections.

SUMMARY OF THE INVENTION

It is an object of the present invention to provide a transmission power control system and a transmission power control method in code division multiple access system capable of controlling the aimed SIR in order to maintain all channels to be an optimum communication quality even when there is a difference in communication quality in each channels in case that a mobile station performs a multi-code transmission.

For solving the above problems, a transmission power control system in code division multiple access system according to the present invention comprises the following base station and the base station control apparatus.

The base station measures the signal to interference ratio (SIR) of a received signal corresponding to each of a plurality of channels established between the base station and a mobile station, and determines a bit pattern for transmission power control for each of groups specified to the plurality of channels on the basis of an aimed SIR and the measured SIR. The base station control apparatus determines the aimed SIR on the basis of data giving groups specified to the plurality of channels and the communication quality corresponding to each of the channels, and instructs the aimed SIR to the base station.

The specified groups are determined on the basis of the communication quality corresponding to each of the channels. The bit pattern is determined in response to a bit pattern addition command, which is instructed by the base station control apparatus, giving a channel number to add the bit pattern in a plurality of channels established between the base station and a mobile station.

The base station control apparatus performs a diversity synthesis process corresponding to each of the channels for measuring the communication quality of each of the channels, and outputs the bit pattern addition command giving a channel number to add the bit pattern, and the aimed SIR determined on the basis of group specification data, which have been determined by the communication quality corresponding to each of the channels, giving the specified groups.

The base station further comprises a modem card part for calculating the measured SIR corresponding to each of the channels, and determining the bit pattern on the basis of the measured SIR and the aimed SIR in response to the bit pattern addition command. The modem card part further comprises a pattern determination part and a frame generation part.

The pattern determination part determines the bit pattern on the basis of the measured SIR and the aimed SIR in response to the bit pattern addition command; and the frame generation part adds the determined bit pattern, pilot bits for frame synchronism establishment process, and the channel number given by the bit pattern addition command to data bits.

Also, the base station control apparatus further comprises a diversity hand-over trunk part, a quality measurement part, a group setting part and an aimed SIR determination part.

The diversity hand-over trunk part corresponding to each of the channels carries out the diversity synthesis process corresponding to each of the channels, and outputs diversity synthesis data; the quality measurement part measures and outputs communication quality data giving the communication quality corresponding to each of the channels in response to the diversity synthesis data; the group setting part determines and outputs the group specification data and the bit pattern addition command in response to the aimed SIR and the communication quality data; and the aimed SIR determination part determines the aimed SIR in response to the communication quality data and the group specification data.

The group setting part further comprises group combination means for combining two groups arbitrarily selected from among the specified groups when the absolute value of the difference between the aimed SIRs of the two groups is less than a predetermined first threshold value; and group division means for calculating a mean value from values of the communication quality data in the specified groups, and dividing the channels giving the communication quality data from the channels into a newly set group when the absolute value of the difference between the values of the communication quality data in the specified groups and the mean value is more than a predetermined second threshold value.

In another aspect, the group setting part further comprises group combination means for combining two groups arbitrarily selected from among the specified groups when the absolute value of the difference between the aimed SIRs of the two groups is less than a predetermined first threshold value; and group division means for calculating a mean value from the maximum value and minimum value of the communication quality data in the specified groups, and dividing the channels giving the communication quality data higher than the mean value from the channels into a newly set group when the difference between the maximum value and the minimum value is more than a predetermined third threshold value.

As for a transmission power control method in code division multiple access system, the method comprises:

(A) measuring a signal to interference ratio (SIR) of a received signal, at a base station, corresponding to each of a plurality of channels established between at least one base station and a mobile station;

(B) generating, at a base station control apparatus, a bit pattern addition command giving a channel number to add a bit pattern for transmission power control to each of the specified groups to the channels, and an aimed SIR being set every group based on group specification data showing the specified groups; and (C) determining, at the base station, the bit pattern on the basis of the aimed SIR and the measured SIR in response to the bit pattern addition command.

The step (B) above comprises: carrying out a diversity synthesis process, and outputting diversity synthesis data; generating communication quality data giving the communication qualities corresponding to the channels in response to the diversity synthesis data; outputting the group specification data and the bit pattern addition command in response to the aimed SIR and the communication quality data; and determining the aimed SIR corresponding to the specified groups in response to the communication quality data and the group specification data.

The step of outputting the group specification data and the bit pattern addition command above comprising:

combining two groups arbitrarily selected from among the specified groups when the absolute value of the difference between the aimed SIRs of the two groups is less than a predetermined first threshold value; and calculating a mean value from values of the communication quality data in the specified groups, and dividing the channels giving the communication quality data from the channels into a newly set group when the absolute value of the difference between the values of the communication quality data in the specified groups and the mean value is more than a predetermined second threshold value.

In another aspect, the step of outputting the group specification data and the bit pattern addition command above comprising:

combining two groups arbitrarily selected from among the specified groups when the absolute value of the difference between the aimed SIRs of the two groups is less than a predetermined first threshold value; and calculating a mean value from the maximum value and minimum value of the communication quality data in the specified groups, and dividing the channels giving the communication quality data higher than the mean value from the channels into a newly set group when the difference between the maximum value and the minimum value is more than a predetermined third threshold value.

The step (C) above comprises: determining the bit pattern on the basis of the measured SIR and the aimed SIR in response to the bit pattern addition command; and adding the determined bit pattern, pilot bits for frame synchronism establishment process, and the channel number in response to the determined bit pattern and the channel number.

BRIEF DESCRIPTION OF THE DRAWINGS

FIG. 7 shows a frame format of the transmission signal for explaining frame generation of a transmission signal to add TPC bits.

FIG. 8 shows an example of the setting preparation table included in the group setting part.

FIG. 9 is a chart for explaining frame generation of a transmission signal corresponding to each of a plurality of channels.

DETAILED DESCRIPTION OF THE PREFERRED EMBODIMENTS

Next, the preferred embodiments of transmission power control system and transmission power control method in code division multiple access system according to the present invention will be described in detail with reference to the accompanying drawings.

Figure 1:
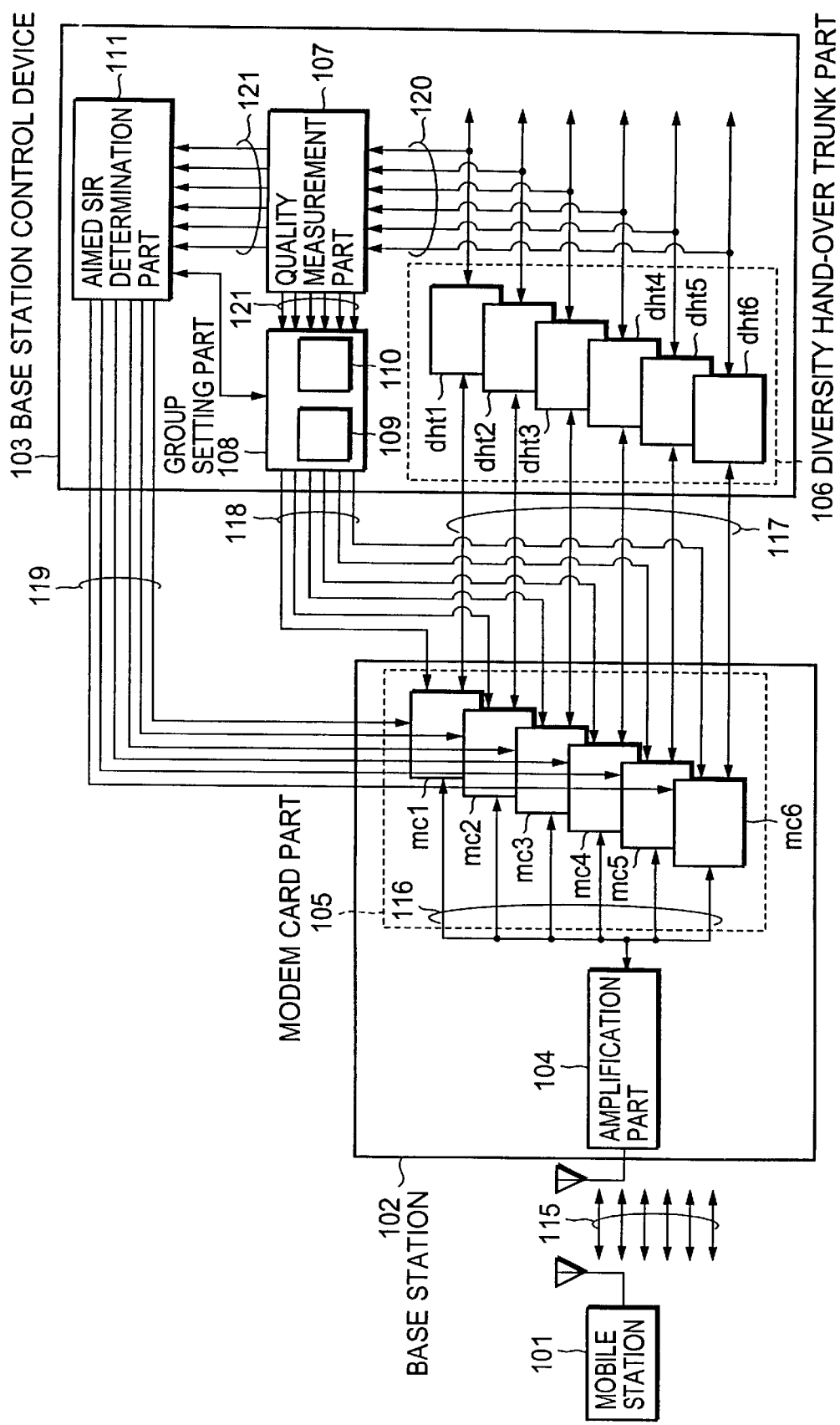
FIG. 1 is a block diagram illustrating a transmission power control system in CDMA system according to the first embodiment of the present invention.

FIG. 1 shows a transmission power control system in code division multiple access (hereinafter called CDMA) system according to the first embodiment of the present invention. This system comprises a mobile station 101, a base station 102 and a base station control apparatus 103.

Referring to FIG. 1, a communication connection by a plurality of channels 115 (the number of channels is six in FIG. 1) between the mobile station 101 and at least one base station (only the base station 102 is shown in FIG. 1) is established. The channels 115 are given the corresponding channel numbers (not shown in FIG. 1), respectively. The mobile station 101 assigns an individual spread code to each of the channels 115, performs a code spread modulation to a signal to be transmitted, and then transmits the modulated signal to the base station 102 (hereinafter called multi-code transmission).

The base station 102 comprises an amplification part 104 and a modem card part (modem/pattern determination means) 105. The amplification part 104 amplifies a received signal (not shown in FIG. 1) from the mobile station 101 corresponding to each of the channels 115 to output an amplification signal (an amplification signal group 116 is shown in FIG. 1). The modem card part 105 comprises modem cards (modem/pattern determination means: mc1 to mc6 are shown in FIG. 1) corresponding to the respective channels 115, and performs a code spread demodulation of the amplification signal from the amplification part 104 with the individual spread code assigned to the corresponding channel to output a demodulated amplification signal (a demodulated amplification signal group 117 is shown in FIG. 1).

The modem card part 105 measures the signal to interference ratio (SIR) corresponding to each of the channels 115 from the demodulated amplification signal (measured SIR: not shown in FIG. 1).

Furthermore, the modem card part 105 determines a bit pattern for transmission power control corresponding to each in a group (channel group) specified in a manner described later to the channels 115, on the basis of the measured SIR and an aimed SIR (an aimed SIR group 119 is shown in FIG. 1) from an aimed SIR determination part 111, in response to a bit pattern addition command (a bit pattern addition command group 118 is shown in FIG. 1) from a group setting part 108 described later.

Figure 2:
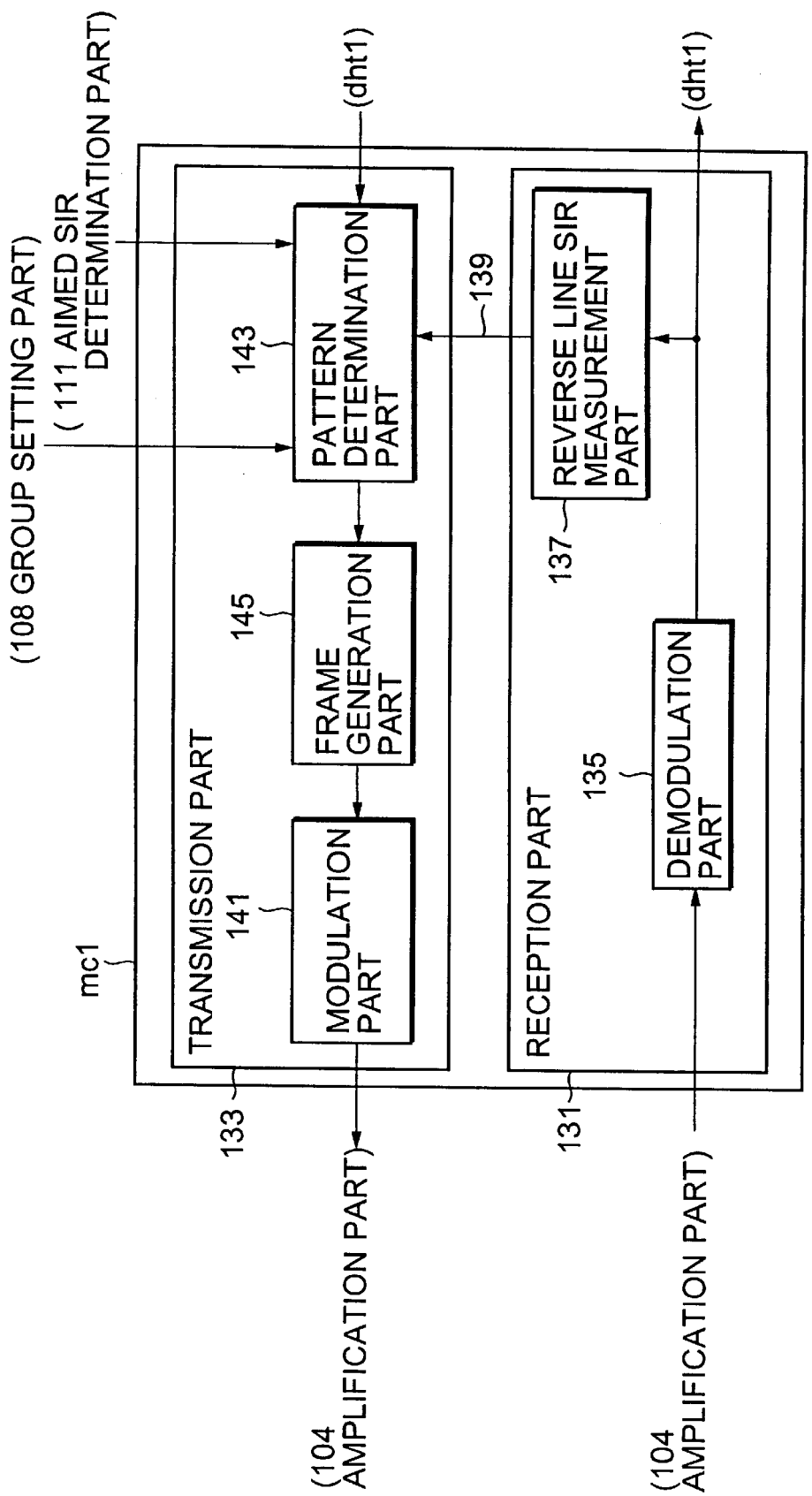
FIG. 2 is a block diagram illustrating the internal construction of a modem card according to the first embodiment of the present invention.

FIG. 2 is a block diagram showing the internal construction of each modem card of the modem card part 105. This drawing shows the modem card mc1 but the other modem cards have the same construction. Referring to FIG. 2, the modem card mc1 comprises a transmission part 133 and a reception part 131.

The reception part 131 comprises a demodulation part 135 and a reverse channel SIR measurement part 137. The demodulation part 135 performs a code spread demodulation of an amplification signal from the amplification part 104 with the spread code assigned to the channel corresponding to the modem card mc1 to output a demodulated amplification signal. The reverse channel SIR measurement part 137 calculates a measured SIR 139 in the channel corresponding to the modem card mc1 from the demodulated amplification signal. The measured SIR 139 is used when a TPC (transmission power control) bit pattern is determined in a high-speed closed loop power control in a reverse channel.

The transmission part 133 comprises a modulation part 141, a pattern determination part 143 and a frame generation part 145. The pattern determination part 143 determines a bit pattern for transmission power control on the basis of the measured SIR 139 and an aimed SIR from the aimed SIR determination part 111 in response to a bit pattern addition command from the group setting part 108. In response to the bit pattern determined in the pattern determination part 143 and a channel number given by the bit pattern addition command, the frame generation part 145 adds the determined bit pattern, pilot bits for a frame synchronism establishment process, and the channel number to data bits to be transmitted.

Referring to FIGS. 1 and 2, the base station 102 calculates a measured SIR in response to a received signal corresponding to each of the channels from the mobile station 101. Besides, the base station 102 determines a bit pattern for transmission power control corresponding to each in a group specified to the channels, on the basis of the aimed SIR and measured SIR in response to a bit pattern addition command from the base station control apparatus 103.

Referring next to FIG. 1, the base station control apparatus 103 comprises a diversity hand-over trunk part 106, a quality measurement part 107, a group setting part 108, and an aimed SIR determination part 111.

The diversity hand-over trunk part 106 includes diversity hand-over trunks (diversity synthesis means: dht1 to dht6 are shown in FIG. 1) corresponding to the respective channels 115. In response to the respective amplification signals demodulated in the base station 102, the diversity hand-over trunk part 106 carries out diversity synthesis processes corresponding to the channels 115 to output diversity synthesis data (a diversity synthesis data group 120 is shown in FIG. 1).

The diversity synthesis in this case means a site-diversity in which signals received by a plurality of base stations are diversity-synthesized when communication paths between the mobile station 101 and a plurality of base stations are established in a soft-hand-off process that is a characteristic feature of CDMA system. It is carried out with respect to each of the channels 115.

In response to the diversity synthesis data, the quality measurement part 107 outputs communication quality data (a communication quality data group 121 is shown in FIG. 1) to give communication qualities corresponding to the respective channels 115.

The group determination part 108 includes group combination means 109 and group division means 110. It outputs group specification data and a bit pattern addition command in response to an aimed SIR from the aimed SIR determination part 111 and communication quality data from the quality measurement part 107. The group specification data gives a specified group to the channels 115 on the basis of the aimed SIR from the aimed SIR determination part 111 and the communication quality data from the quality measurement part 107. The bit pattern addition command gives a channel number to add a bit pattern for transmission power control in the channels 115.

The aimed SIR determination part 111 determines an aimed SIR corresponding to the specified group in response to the communication quality data from the quality measurement part 107 and the group specification data from the group setting part 108.

That is, the base station control apparatus 103 carries out a diversity synthesis process corresponding to each of the channels 115 to output a bit pattern addition command and an aimed SIR that is determined with respect to each group on the basis of the group specification data. In this embodiment, the aimed SIR that the group setting part 108 obtains from the aimed SIR determination part 111 is given directly from the aimed SIR determination part 111 or indirectly from the modem card part 105 or the like.

Figure 3:
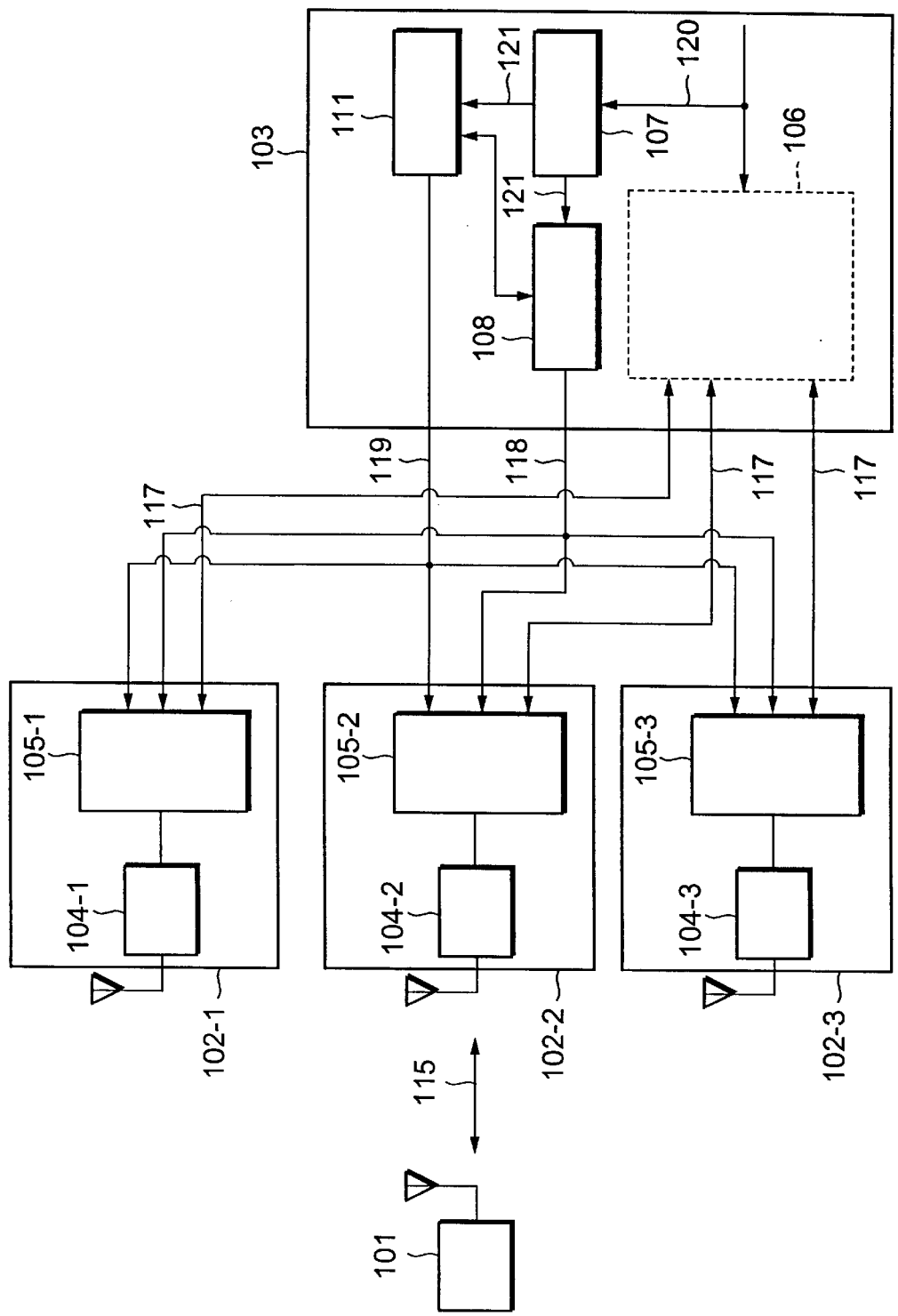
FIG. 3 is a block diagram for explaining the transmission power control system in CDMA system according to the first embodiment of the present invention.

FIG. 1 shows a case that the mobile station 101 performs the multi-code transmission only to the base station 102. FIG. 3 shows a case that the mobile station 101 performs hand-over operations between the mobile station 101 and three base stations (102-1 to 102-3). The construction of each of the three base stations (102-1 to 102-3) is the same as that of the base station 102 shown in FIG. 1.

Referring to FIG. 3, a communication connection by a plurality of channels 115 (the number of them is six) between the mobile station 101 and three base stations 102-1 to 102-3 is established. The diversity hand-over trunk part 106 in the base station control apparatus 103 operates to output with respect to each of the base stations 102-1 to 102-3. It carries out diversity synthesis processes in response to demodulated amplification signals (a demodulated amplification signal group 117 is shown in FIG. 3).

Figure 4:
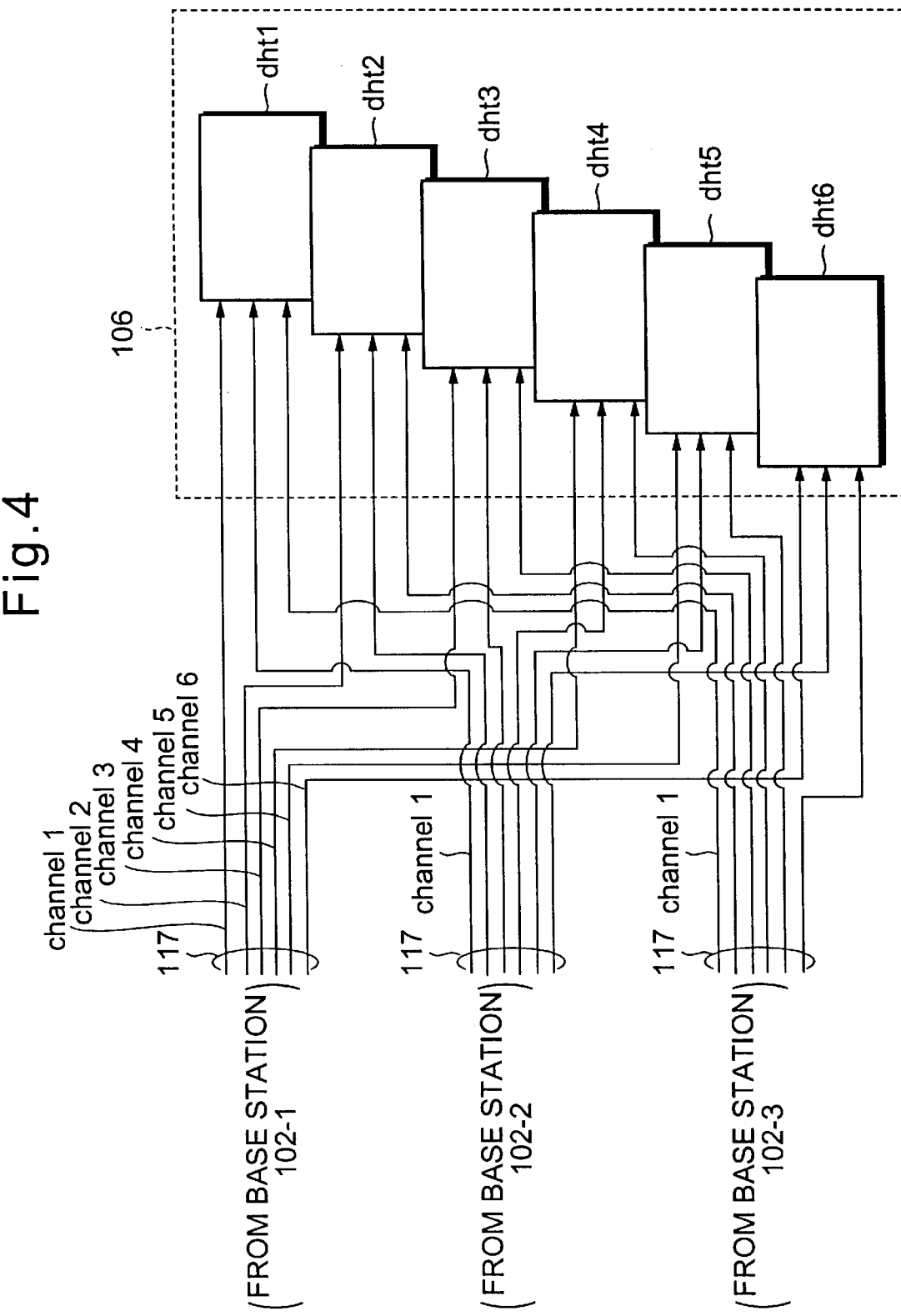
FIG. 4 is a block diagram illustrating connections in a diversity hand-over trunk part according to the first embodiment of the present invention.

FIG. 4 shows a detail of connections in the diversity hand-over trunk part 106 of FIG. 3. The diversity hand-over trunks dht1 to dht6 respond to demodulated amplification signals (demodulated amplification signal groups 117 are shown in FIG. 4) from each of the base stations 102-1 to 102-3. The demodulated amplification signals are denoted by the corresponding channel numbers, respectively. For example, the diversity hand-over trunk dht1 corresponds to "channel 1" in the channels 115 (the number of them is six). The diversity hand-over trunk dht1 carries out a diversity synthesis process in response to the demodulated amplification signal corresponding to the "channel 1" from each of the base stations 102-1 to 102-3.

Next, operations of the transmission power control system in CDMA system according to the present invention will be described with reference to FIGS. 1, 2 and 5. The same operations are done also in case that the mobile station 101 performs hand-over operations between it and a plurality of base stations (FIG. 3).

Referring to FIG. 1, the mobile station 101 performs a multi-code transmission between it and the base station 102. In the base station 102, the amplification part 102 amplifies received signals corresponding to the channels 115 (the number of them is six) to output amplification signals to the channels 115, respectively. The modem card part 105 performs code spread demodulation of the amplification signals with spread codes assigned to the respective channels 115, to output demodulated amplification signals. Further, the modem card part 105 calculates measured SIRs from the demodulated amplification signals.

Next, in the base station control apparatus 103, the diversity hand-over trunk part 106 carries out diversity synthesis processes corresponding to the respective channels 115 in response to the demodulated amplification signals, to output diversity synthesis data. In response to the diversity synthesis data, the quality measurement part 107 outputs communication quality data to give communication qualities (BER (bit error rate) or FER (frame error rate)) corresponding to the channels 115. FER is applied in this embodiment. The group setting part 108 outputs group specification data that the channels in the multi-code transmission are classified into some groups, and a bit pattern addition command for designating the channel to which a bit pattern should be added, in response to an aimed SIR and the communication quality data by the group combination process means 109 and group division means 110.

An outline of the process in the group setting part 108 will be described. On the basis of the communication quality data corresponding to the respective channels 115 obtained in the quality measurement part 107, the group setting part 108 specifies channels in which relatively the same communication quality is measured, as one group. In case that the communication qualities of the channels vary widely, a plurality of groups is therefore specified. The channel construction of each of the specified groups is transmitted to the aimed SIR determination part 111 to determine an aimed SIR for each group. The aimed SIRs determined in the aimed SIR determination part 111 are given to the modem cards of the base station 102 corresponding to the respective channels 115.

The group setting part 108 designates a representative channel (the first connection) from among at least one channel constituting each group, and sends out a bit pattern addition command including designation data for the channel to each modem card of the base station in order to perform a transmission power control to the channel by comparing the measured SIR and aimed SIR.

By carrying out the above process at regular intervals, a transmission power control always coping with the variation of the communication quality corresponding to each of the channels 115 is performed. The above-described specified group therefore varies its channel construction, and the number of groups also varies according to conditions. Hereinafter, the process of the group setting part 108 will be described in detail with reference to FIG. 5 and the drawings following it.

Figure 5:
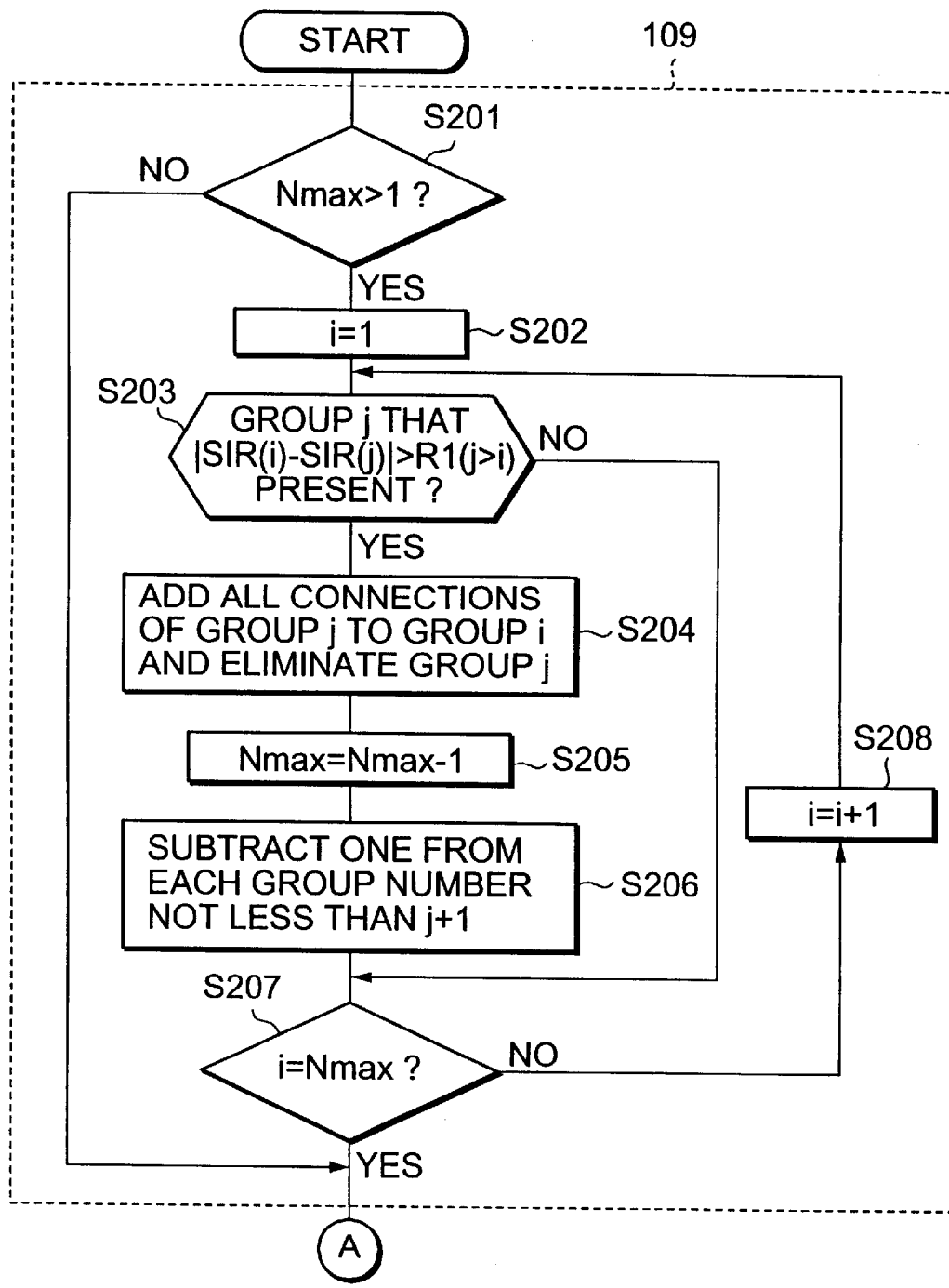
FIG. 5 is a flowchart for explaining a part of operations of the transmission power control system in CDMA system according to the first embodiment of the present invention.
Figure 6:
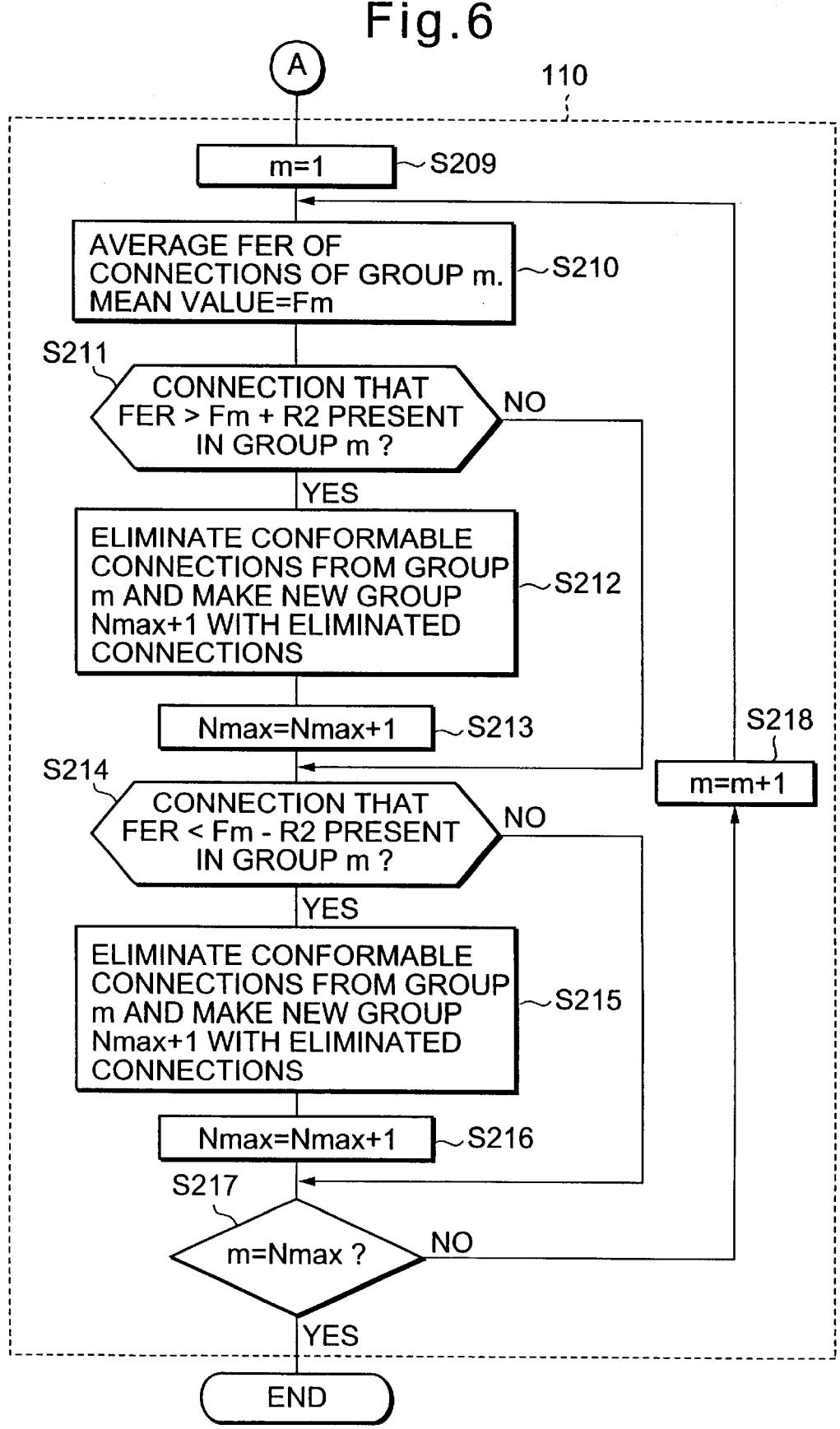
FIG. 6 is a flowchart for explaining a part of operations of the transmission power control system in CDMA system according to the first embodiment of the present invention.

FIGS. 5 and 6 show flowcharts of processes in the group setting part 108. Since the aimed SIR is renewed at regular intervals in each specified group, the group setting part 108 carries out setting groups on the basis of the specified groups and the number Nmax of specified groups. That is, the group setting part 108 stores the aimed SIRs with respect to the specified groups on the basis of each group number. Next, the group setting part 108 prepares a group setting table shown in FIG. 8 in response to the communication quality data corresponding to each of the channels 115 from the quality measurement part 107.

Referring to FIG. 5, at first, it is examined whether the number Nmax of specified groups is plural or not (step S201). In the step S201, in case that the channels 115 are constituted by a plurality of groups, a group combination process (steps S202 to S208) is carried out, and then a group division process (steps S209 to S218) is carried out. In case that the channels are constituted by a single group, the group division process is carried out.

The group combination process is a process that is performed when the condition of the previous process has changed so that groups can be combined into a less number of groups. The group division process is a process that is performed when groups are divided more minutely in accordance with a change after the condition of the previous process.

In the group combination process, at first, a group as a base (the group number i=1) is set (step S202), and the aimed SIR of the group 1 is compared with the aimed SIRs of the other groups than the group 1 to judge whether or not there is a group that the difference in the absolute value of the aimed SIR is not more than a predetermined threshold value R1 (step S203).

In the step S203, when it is judged that there is a air of groups that the difference in the absolute value of the aimed SIR is not more than the predetermined threshold value R1, the channels belonging to the two groups are combined into one group (step S204). In the step S204, the group number having paired with the base group 1 is eliminated to decrease the number Nmax of total groups by one (step S205). Further, each group number other than the combined pair of groups is decreased by one (step S206).

Next, the group number i as a base is compared with the number Nmax of total groups (step S207). In the step S207, a group division process is carried out when the base group number i is equal to the number Nmax of total groups. When the base group number i is not equal to the number Nmax of total groups, the base group number i is increased by one (step S208) and then the above steps S203 to S207 are repeated.

The above group combination process is a process that two groups arbitrarily selected from a specified groups are combined when the absolute value of the difference between the SIRs to aim of the two groups is less than a predetermined first threshold value.

Referring to FIG. 6, in the group division process, at first, a group (the group number m=1) as a base is set (step S209), the mean value Fm of the communication qualities (FER) corresponding to the respective channels belonging to the group 1 is calculated (step S210).

Next, the communication quality of each channel belonging to the group 1 is compared with a value that a predetermined threshold value R2 is added to the mean value Fm (F1 in this case) calculated in the step S210 (step S211). In the step S211, when the communication quality is more than the value that the threshold value R2 is added to the mean value F1, the channels corresponding to the communication quality are eliminated from the group 1 and classified into a newly set group (step S212). In the step S212, the newly set group is given the group number Nmax+1. At the same time, the number Nmax of total groups is increased by one (step S213).

In the step S211, when the communication quality is equal to or less than the value that the predetermined threshold value R2 is added to the mean value F1, a step S214 and steps following it are carried out.

Next, the communication quality of each channel belonging to the same group 1 is compared with a value that the predetermined threshold value R2 is subtracted from the mean value F1 (step S214). In the step S214, when the communication quality is less than the value that the threshold value R2 is subtracted from the mean value F1, the channels corresponding to the communication quality are eliminated from the group 1 and classified into a newly set group (step S215). In the step S215, the newly set group is given the group number Nmax+1. At the same time, the number Nmax of total groups is increased by one (step S216).

In the step S214, when the communication quality is equal to or more than the value that the predetermined threshold value R2 is added to the mean value F1, the process of a step S217 is carried out.

Next, the group number m as a base is compared with the number Nmax of total groups (step S217). In the step S217, when the base group number m is equal to the number Nmax of total groups, the group division process is completed.

When the base group number m is not equal to the number Nmax of total groups, the base group number m is increased by one (step S218) and then the above steps S210 to S217 are repeated.

In the above group division process, a mean value is calculated on the basis of the communication qualities (communication quality data) in a specified group. Next, it is a process that the channels giving the communication quality are divided from among a plurality of channels into a newly set group when the absolute value of the difference between the communication quality corresponding to the specified group and the mean value is more than a predetermined second threshold value. By carrying out this group division process to all groups, each group is constituted by channels that the difference in communication quality after diversity synthesis is little.

By the above-described processes by the group combination means 109 and group division means 110, the group setting part 108 outputs group specification data for specifying a group to which each of the channels 115 belongs and the number of groups. The group setting part 108 further outputs bit pattern addition commands to the modem cards (mc1 to mc6) corresponding to the respective channels. The bit pattern addition command gives a channel number (this channel is called first connection) to add a TPC bit pattern and pilot bits to data bits to transmit in each of the specified groups.

The aimed SIR determination part 111 determines a new aimed SIR corresponding to each of the specified groups in response to the communication quality data from the quality measurement part 107 and the group specification data from the group setting part 108. The aimed SIR determination part 111 obtains a mean communication quality in each of the specified groups on the basis of the communication quality data and group specification data. Next, it determines a new aimed SIR corresponding to each of the specified groups in order that the mean communication quality becomes a desired communication quality. Or, in the channels belonging to each of the specified groups, a new aimed SIR is determined in order that the communication quality of the channel whose communication quality is the worst becomes a desired communication quality. The aimed SIR is output corresponding to each of the channels 115.

The reason why the aimed SIR is renewed at regular intervals is concerned by a variation of the transmission characteristic between the mobile station and base station. There arises a case that the desired communication quality is not satisfied though the measured SIR reaches the aimed SIR. Contrastingly, there arises a case that the desired communication quality is satisfied though the measured SIR does not reach the aimed SIR. The base station, therefore, needs to control the aimed SIR at regular intervals in consideration of the variation of the transmission characteristic between the mobile station and base station.

In response to the aimed SIR corresponding to each of the specified groups, the group setting part 108 prepares a form of group setting table (a state that numerical values on communication quality (FER) are eliminated from FIG. 8) to be ready for next group-setting.

In the modem card part 105 of the base station 102, each of the modem cards (mc1 to mc6) corresponding to the respective channels 115 determines a TPC bit pattern from the aimed SIR 139 and aimed SIR in response to the bit pattern addition command in the pattern determination part 143.

The pattern determination part 143 judges whether or not the channel number to add the TPC bits contained in the bit pattern addition command is the channel number to which the modem card accommodating the pattern determination part 143 itself corresponds. When the pattern determination part 143 has judged that the channel number to add the TPC bits is the channel number to which the modem card accommodating the pattern determination part 143 itself corresponds, it determines TPC bits from the measured SIR 139 and aimed SIR, and outputs the TPC bits and the channel number to add the TPC bits. When the pattern determination part 143 has judged that the channel number to add the TPC bits is not the channel number to which the modem card accommodating the pattern determination part 143 itself corresponds, it outputs only the channel number to add the TPC bits. As the TPC bits, for example, a bit pattern is set for requesting to increase the reverse transmission power when the measured SIR is less than the aimed SIR, and a bit pattern is set for requesting to decrease the reverse transmission power when the measured SIR is more than the aimed SIR.

Next, in response to the TPC bits and channel number to add the TPC bits from the pattern determination part 143, the frame generation part 145 adds the TPC bits, pilot bits for a frame synchronism establishment process and the channel number to data bits to transmit, and outputs it as a transmission signal. Or, in response to the TPC bits from the pattern generation part 143, the frame generation part 145 adds the TPC bits to the data bits to transmit, and outputs it as a transmission signal. FIG. 7 shows the frame generation in each channel.

The modulation part 141 gives the transmission signal a code spread modulation with the spread code individually set to the channel corresponding to the modem card, and outputs it.

The mobile station 101 receives the transmission signal from the base station by spread demodulation with the spread codes individually set to the respective channels, and recognizes the TPC bits of the channels belonging to each group specified to the channels.

Next, the first embodiment of the present invention will be described in detail with reference to an example. Referring to FIG. 1, it is supposed that the mobile station 101 performs multi-code transmissions through six channels (channel 1, channel 2, channel 3, channel 4, channel 5 and channel 6 not shown in FIG. 1) between it and the base station 102. At present, it is supposed that the six channels are classified into three groups. The constitution of groups is group 1={channel 1, channel 4 and channel 6}, group 2={channel 3}, and group 3={channel 2 and channel 5}.

The respective modem cards mc1 to mc6 corresponding to the six channels demodulate amplification signals from the amplification part 104 to output demodulated amplification signals. Next, the respective diversity hand-over trunks dht1 to dht6 corresponding to the six channels carry out diversity synthesis processes corresponding to the six channels to output diversity synthesis data.

The quality measurement part measures communication qualities in response to the respective diversity synthesis data corresponding to the six channels, to output communication quality data. Also in this example, FER is applied as the communication quality.

FIG. 8 shows a setting preparation table for giving the communication qualities (FER) corresponding to the six channels, respectively, and aimed SIRs at present. The group setting part 108 carries out a classification to the six channels with the aimed SIRs at present and the communication qualities (communication quality data).

Referring to FIGS. 5, 6 and 8, at first, a group combination process is carried out. The aimed SIRs in the groups 1 to 3 are compared (step S203). In the step S203, because the difference between the aimed SIRs of the groups 1 and 2 is 0.2 dB that is less than the threshold value R1 (=0.5 dB as a supposition), the groups 1 and 2 are combined (step S204).

By the group combination process, the constitution of groups is renewed to group 1={channel 1, channel 3, channel 4 and channel 6} and group 2={channel 2 and channel 5}.

Next, for carrying out a group division process, a mean value Fm is obtained from the communication qualities of the channels belonging to the group 1 or 2 (step S210). Observing first the group 1, the mean value F1 of the channel 1, channel 3, channel 4 and channel 6 is F1=−23.84 dB. Because the communication quality of the channel 1 is more than the value that the threshold value R2 (=5 dB as a supposition) is subtracted from the mean value F1 (step S214), the channel 1 is eliminated from the group 1 and classified into a newly set group 3 (step S215). By the group division process based on the group 1, the constitution of groups is renewed to group 1={channel 3, channel 4 and channel 6}, group 2={channel 2 and channel 5} and group 3={channel 1}. Observing next the group 2, the mean value F2 of the channel 2 and channel 5 is F2=−21.11 dB and there is no channel having FER more than the value that the second threshold value R2 is subtracted from the mean value F2, so no division process of the group 2 is carried out.

After classification to the six channels are carried out by the above method, the group setting part 108 notifies the aimed SIR determination part 111 of group specification data as information on the new group constitution.

The aimed SIR determination part 111 regulates the aimed SIR of each specified group with the group specification data from the group setting part 108 and the communication quality data from the quality measurement part 107. In the regulation process of the aimed SIR, the mean value of the communication qualities of the channel 3, channel 4 and channel 6 belonging to the group 1 is $5.27 \times 10^{-3}$. In case that FER desired for all channels is $1 \times 10^{-3}$, because the mean value of the communication qualities is more than the desired value, the aimed SIR is increased to 7.0 dB.

Besides, because the mean value of the communication qualities of the channel 2 and channel 5 belonging to the group 2 is $7.75 \times 10^{-3}$ more than the desired value $1 \times 10^{-3}$, the aimed SIR is increased by 7.5 dB. By increasing the aimed SIR and increasing the transmission power of reverse link to more than the previous one, a desired communication quality can be satisfied.

Besides, because the communication quality of the channel 1 belonging to the group 3 is $7.0 \times 10^{-4}$ less than the desired value $1 \times 10^{-3}$, the aimed SIR is decreased to 6.0 dB. By decreasing the aimed SIR, an excessive supply of transmission power in reverse link can be prevented.

The aimed SIR determination part 111 notifies the respective modem cards mc1 to mc6 corresponding to the six channels of the aimed SIRs. The group setting part 108 notifies the modem cards mc1 to mc6 of the channel numbers to add TPC bits.

As a result of this example, the first connection becomes the channel 3 in the group 1, the channel 2 in the group 2, and the channel 1 in the group 1. In the first connection, pilot bits, TPC bits and the channel number to add the TPC bits are added to data to transmit. The transmission signal from the base station is transmitted in such a format as shown in FIG. 9.

Next, a transmission power control system and a transmission power control method in CDMA system according to the second embodiment of the present invention will be described. The construction of the transmission power control system in CDMA system according to this embodiment is the same as that of the above-described first embodiment.

Figure 10:
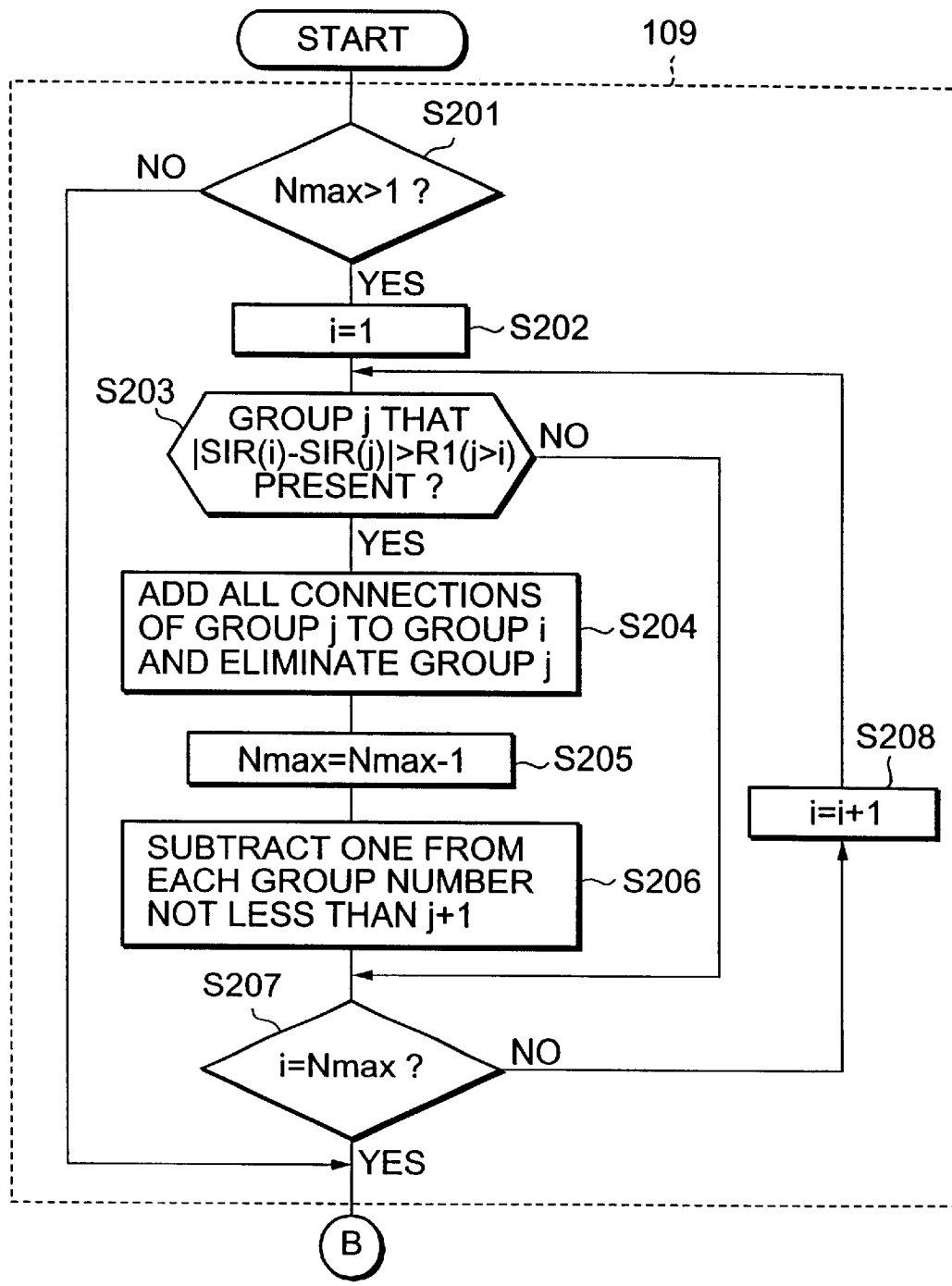
FIG. 10 is a flowchart for explaining a part of operations of a transmission power control system in CDMA system according to the second embodiment of the present invention.
Figure 11:
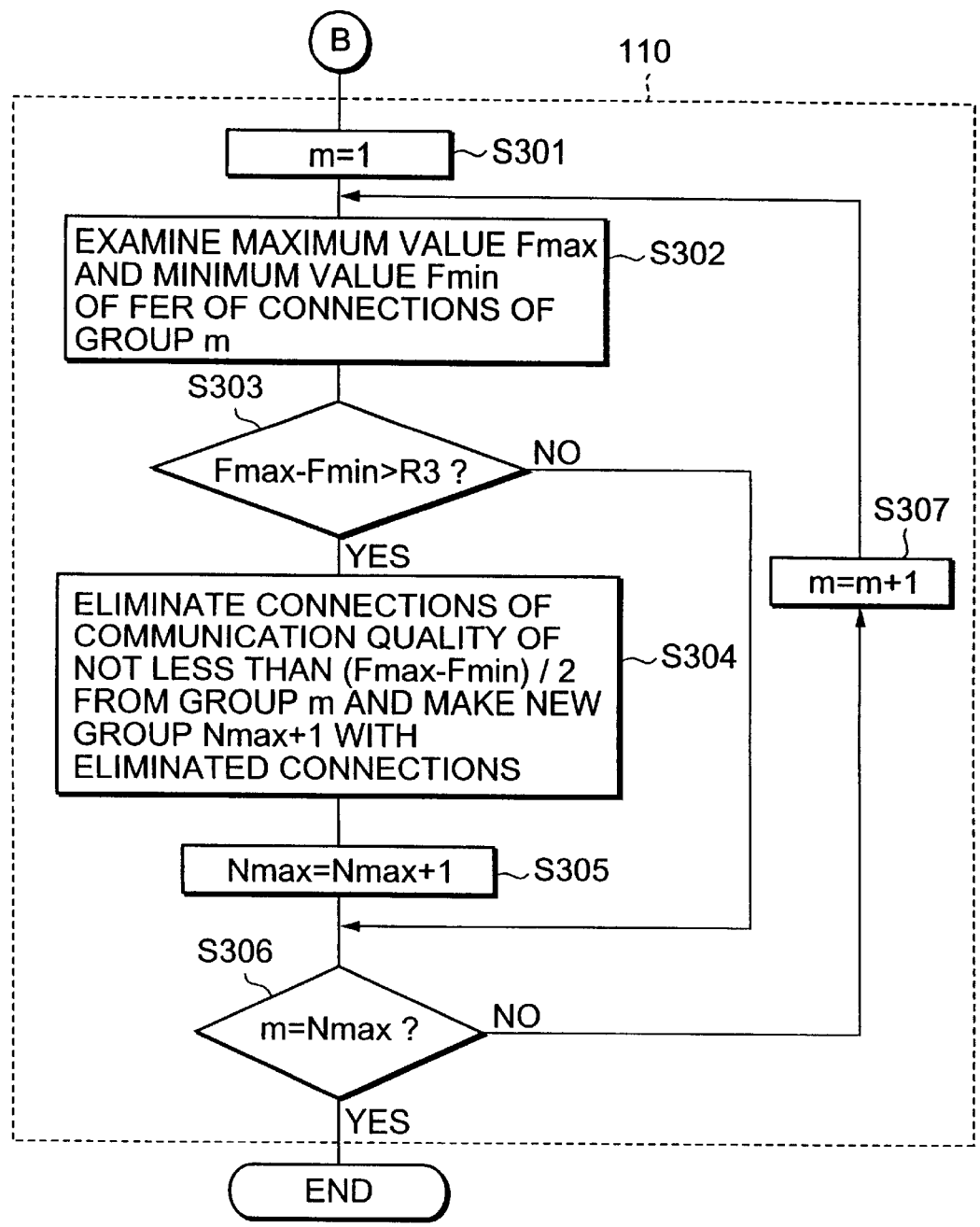
FIG. 11 is a flowchart for explaining a part of operations of the transmission power control system in CDMA system according to the second embodiment of the present invention.
Figure 12:
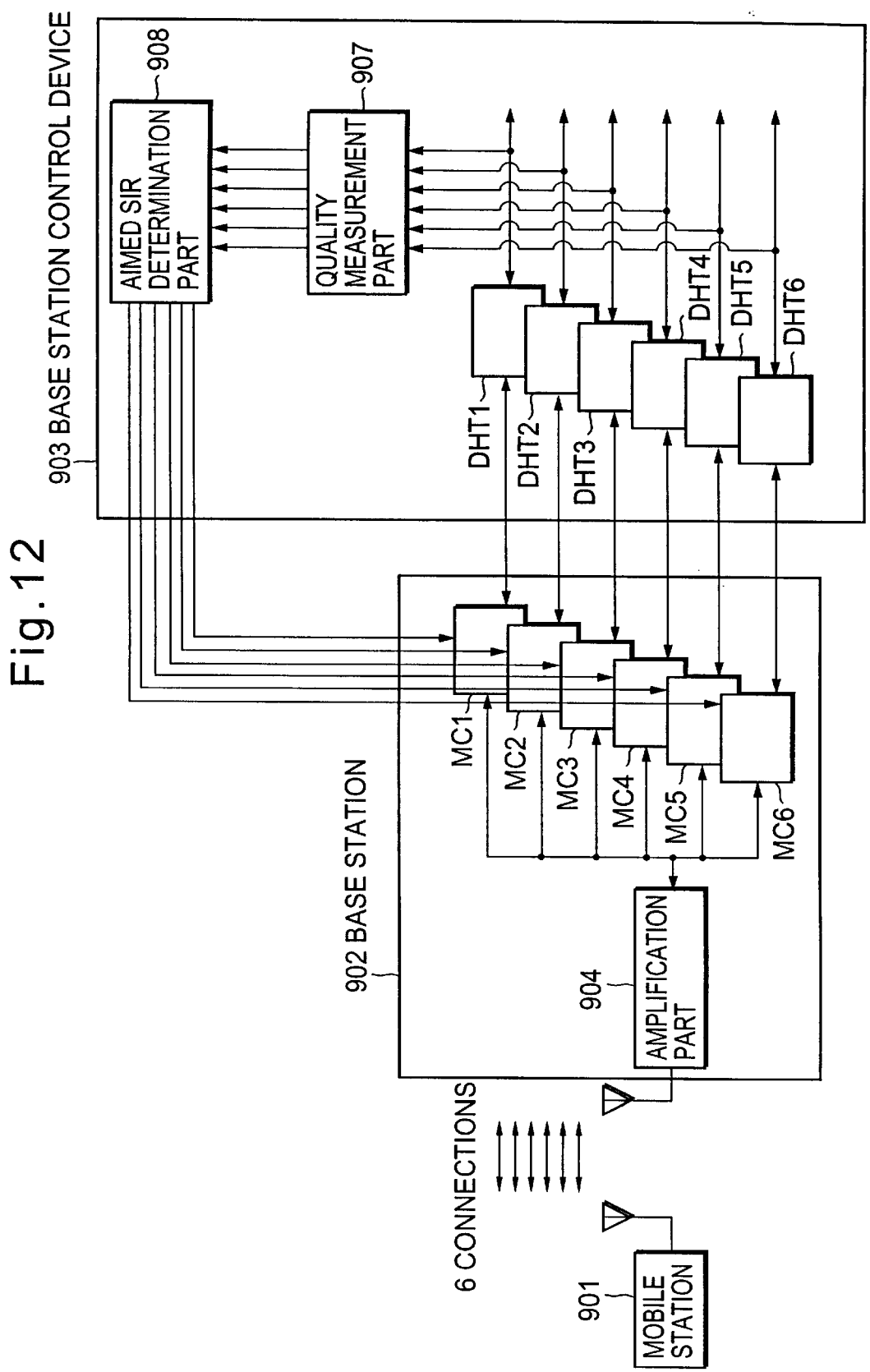
FIG. 12 is a block diagram illustrating a conventional transmission power control system.
Figure 13:
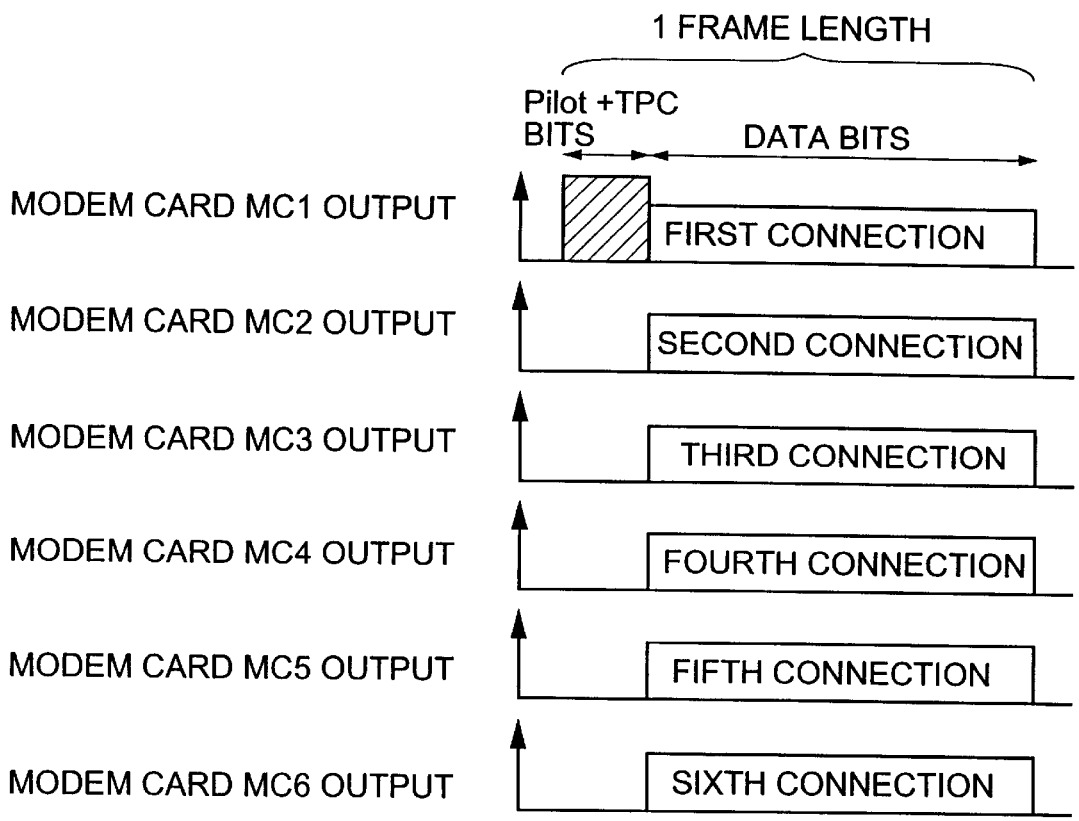
FIG. 13 is a chart for explaining frame generation of a transmission signal corresponding to each of a plurality of channels in the conventional transmission power control system.
Figure 14:
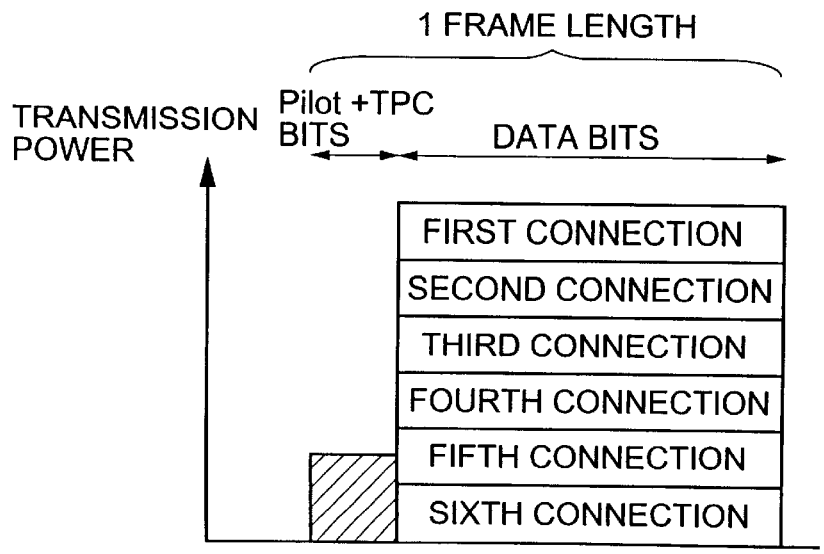
FIG. 14 is a chart for explaining frame generation of a transmission signal corresponding to each of a plurality of channels in the conventional transmission power control system.

FIGS. 10 and 11 show operations of the transmission power control system in CDMA system according to the second embodiment. In comparison with the operations described in the first embodiment, the operations in this embodiment differ only in the process content by the group division process means 110 in FIG. 1. The group combination process shown in FIG. 10 is the same as the process shown in FIG. 5.

Referring to FIG. 11, in the group division process in this embodiment, at first, a group (the group number m=1) as a base is set (step S301), and the maximum value Fmax and minimum value Fmin of the communication qualities corresponding to the channels belonging to the group 1 are examined (step S302). In this embodiment, FER is applied to the communication quality like the first embodiment.

Next, it is judged whether or not the difference between the maximum value Fmax and minimum value Fmin of the communication qualities (FER) is not less than a predetermined threshold value R3 (step S303). In the step S303, when the difference between the maximum value Fmax and minimum value Fmin of the communication qualities is not less than the threshold value R3, the channels giving the communication qualities more than the mean value of the maximum value Fmax and minimum value Fmin are eliminated from the group 1 and classified into a newly set group (step S304). In the step S304, the newly set group is given the group number Nmax+1. At the same time, the number Nmax of total groups is increased by one (step S305).

In the step S303, when the difference between the maximum value Fmax and minimum value Fmin of the communication qualities is equal to or less than the threshold value R3, a process on and after a step S306 are carried out.

Next, the base group number m is compared with the number Nmax of total groups (step S306). In the step S306, when the base group number m is equal to the number Nmax of total groups, the group division process is completed.

When the base group number m is not equal to the number Nmax of total groups, the base group number m is increased by one (step S307) and then the above steps S302 to S306 are repeated.

In the above group division process, a mean value is calculated from the maximum value Fmax and minimum value Fmin of the communication qualities (communication quality data) in a specified group. Next, it is a process that the channels giving communication qualities more than the mean value are divided from among a plurality of channels into a newly set group when the difference between the maximum value Fmax and minimum value Fmin is more than a predetermined third threshold value. By carrying out the group division process to all groups, each group can be constituted by channels that the difference in communication quality after diversity synthesis is little.

Next, the second embodiment of the present invention will be described in detail with reference to an example. Referring to FIG. 1, it is supposed that the mobile station 101 performs multi-code transmissions through six channels (channel 1, channel 2, channel 3, channel 4, channel 5 and channel 6) between it and the base station 102. At present, it is supposed that the six channels are classified into three groups. The constitution of groups is group 1={channel 1, channel 4 and channel 6}, group 2={channel 3}, and group 3={channel 2 and channel 5}. The respective modem cards mc1 to mc6 corresponding to the six channels demodulate amplification signals from the amplification part 106 to output demodulated amplification signals. Next, the respective diversity hand-over trunks, dht1 to dht6 corresponding to the six channels carry out diversity synthesis processes corresponding to the six channels to output diversity synthesis data. The quality measurement part measures communication qualities in response to the respective diversity synthesis data corresponding to the six channels, to output communication quality data. Also in this example, FER is applied as the communication quality.

FIG. 8 shows a setting preparation table for giving the communication qualities (FER) corresponding to the six channels, respectively, and aimed SIRs at present. The group setting part 108 carries out a classification to the six channels with the aimed SIRs at present and the communication qualities (communication quality data).

Referring to the setting preparation table shown in FIG. 8 and FIGS. 10 and 11, at first, for carrying out a group combination process, the aimed SIRs in the groups 1 to 3 are compared (step S203). In the step S203, because the difference between the aimed SIRs of the groups 1 and 2 is 0.2 dB that is less than the threshold value R1 (=0.5 dB as a supposition), the groups 1 and 2 are combined (step S204). By the group combination process, the constitution of groups is renewed to group 1={channel 1, channel 3, channel 4 and channel 6} and group 2={channel 2 and channel 5}.

Next, a group division process is carried out. At first, the maximum value Fmax and minimum value Fmin are examined from the communication qualities of the channels belonging to each of the groups 1 and 2 (step S302).

Observing first the group 1, the maximum value Fmax is −22.0 dB and the minimum value Fm:Ln is −31.55 dB. Because the difference between the maximum value Fmax and minimum value Fmin is 9.5 dB more than the threshold value R3 (=5 dB), "channel 1" giving a communication quality less than the mean value −24.56 dB is eliminated from the group 1 and a new group 3 is set. By the group division process based on the group 1, the constitution of groups is renewed to group 1={channel 3, channel 4 and channel 6}, group 2={channel 2 and channel 5} and group 3={channel 1}.

Observing next the group 2, the maximum value Fmax is −20.97 dB and the minimum value Fmin is −21.25 dB. Because the difference between the maximum value Fmax and minimum value Fmin is 0.28 dB less than the threshold value R3 (=5 dB), no division process of the group is carried out.

By the above, the group division process is completed. The result of the process in this example of the second embodiment becomes the same group setting as that in the example of the first embodiment.

As described above in detail with reference to two preferred embodiments, a transmission power control system and a transmission power control method in code division multiple access system according to the present invention make it possible to control the aimed SIR in order that all channels are of a predetermined communication quality even when there is a difference in communication quality in each channel in a multi-code transmission between a mobile station and a base station.

What is claimed is:

1. A transmission power control system in code division multiple access system, comprising:

at least one base station for measuring the signal to interference ratio (SIR) of a received signal corresponding to each of a plurality of channels established between said base station and a mobile station, and determining a bit pattern for transmission power control for each of groups specified to said plurality of channels on the basis of an aimed SIR and said measured SIR in response to a bit pattern addition command; and a base station control apparatus for performing a diversity synthesis process corresponding to each of said channels for measuring the communication quality of each of said channels, and for outputting said bit pattern addition command giving a channel number to add said bit pattern, and said aimed SIR determined on the basis of group specification data, having been determined by the communication quality corresponding to each of said channels, giving said specified groups, said base station comprising: a modem card part for calculating said measured SIR corresponding to each of said channels, and determining said bit pattern on the basis of said measured SIR and said aimed SIR in response to said bit pattern addition command.

2. The transmission power control system in code division multiple access system according to claim 1, said modem card part comprising:

a pattern determination part for determining said bit pattern on the basis of said measured SIR and said aimed SIR in response to said bit pattern addition command; and a frame generation part for adding said determined bit pattern, pilot bits for frame synchronism establishment process, and said channel number given by said bit pattern addition command to data bits.

3. A transmission power control system in code division multiple access system, comprising:

at least one base station for measuring the signal to interference ratio (SIR) of a received signal corresponding to each of a plurality of channels established between said base station and a mobile station, and determining a bit pattern for transmission power control for each of groups specified to said plurality of channels on the basis of an aimed SIR and said measured SIR in response to a bit pattern addition command; and a base station control apparatus for performing a diversity synthesis process corresponding to each of said channels for measuring the communication quality of each of said channels, and for outputting said bit pattern addition command giving a channel number to add said bit pattern, and said aimed SIR determined on the basis of group specification data, having been determined by the communication quality corresponding to each of said channels, giving said specified groups, said base station control apparatus comprising:

a diversity hand-over trunk part corresponding to each of said channels for carrying out the diversity synthesis process corresponding to each of said channels, and outputting diversity synthesis data;

a quality measurement part for measuring and outputting communication quality data giving the communication quality corresponding to each of said channels in response to said diversity synthesis data;

a group setting part for determining and outputting said group specification data and said bit pattern addition command in response to said aimed SIR and said communication quality data; and an aimed SIR determination part for determining said aimed SIR in response to said communication quality data and said group specification data.

4. The transmission power control system in code division multiple access system according to claim 3, said group setting part comprising:

group combination means for combining two groups arbitrarily selected from among said specified groups when the absolute value of the difference between said aimed SIRs of said two groups is less than a predetermined first threshold value; and group division means for calculating a mean value from values of said communication quality data in said specified groups, and dividing the channels giving said communication quality data from said channels into a newly set group when the absolute value of the difference between the values of said communication quality data in said specified groups and said mean value is more than a predetermined second threshold value.

5. The transmission power control system in code division multiple access system according to claim 3, said group setting part comprising:

group combination means for combining two groups arbitrarily selected from among said specified groups when the absolute value of the difference between said aimed SIRs of said two groups is less than a predetermined first threshold value; and group division means for calculating a mean value from the maximum value and minimum value of said communication quality data in said specified groups, and dividing the channels giving said communication quality data higher than said mean value from said channels into a newly set group when the difference between said maximum value and said minimum value is more than a predetermined third threshold value.

6. A transmission power control method in code division multiple access system, said method comprising:

measuring a signal to interference ratio (SIR) of a received signal, at a base station, corresponding to each of a plurality of channels established between at least one base station and a mobile station:

generating, at a base station control apparatus, a bit pattern addition command giving a channel number to add a bit pattern for transmission power control to each of the specified groups to said channels, and an aimed SIR being set for every group based on group specification data showing said specified groups; and determining, at the base station, said bit pattern on the basis of said aimed SIR and said measured SIR in response to said bit pattern addition command, said generating comprising:

carrying out a diversity synthesis process, and outputting diversity synthesis data;

generating communication quality data giving the communication qualities corresponding to said channels in response to said diversity synthesis data;

outputting said group specification data and said bit pattern addition command in response to said aimed SIR and said communication quality data; and determining said aimed SIR corresponding to said specified groups in response to said communication quality data and said group specification data.

7. The transmission power control method in code division multiple access system according to claim 3, said outputting the group specification data and the bit pattern addition command comprising:

combining two groups arbitrarily selected from among said specified groups when the absolute value of the difference between said aimed SIRs of said two groups is less than a predetermined first threshold value; and calculating a mean value from values of said communication quality data in said specified groups, and dividing the channels giving said communication quality data from said channels into a newly set group when the absolute value of the difference between the values of said communication quality data in said specified groups and said mean value is more than a predetermined second threshold value.

8. The transmission power control method in code division multiple access system according to claim 4, said outputting the group specification data and the bit pattern addition command comprising:

combining two groups arbitrarily selected from among said specified groups when the absolute value of the difference between said aimed SIRs of said two groups is less than a predetermined first threshold value; and calculating a mean value from the maximum value and minimum value of said communication quality data in said specified groups, and dividing the channels giving said communication quality data higher than said mean value from said channels into a newly set group when the difference between said maximum value and said minimum value is more than a predetermined third threshold value.

* * * * *